Feb. 22, 1949.  B. G. W. BARTLETT  2,462,455
ANNULAR FLOATING TOOTHED GEARING
Filed Aug. 9, 1945  2 Sheets-Sheet 1
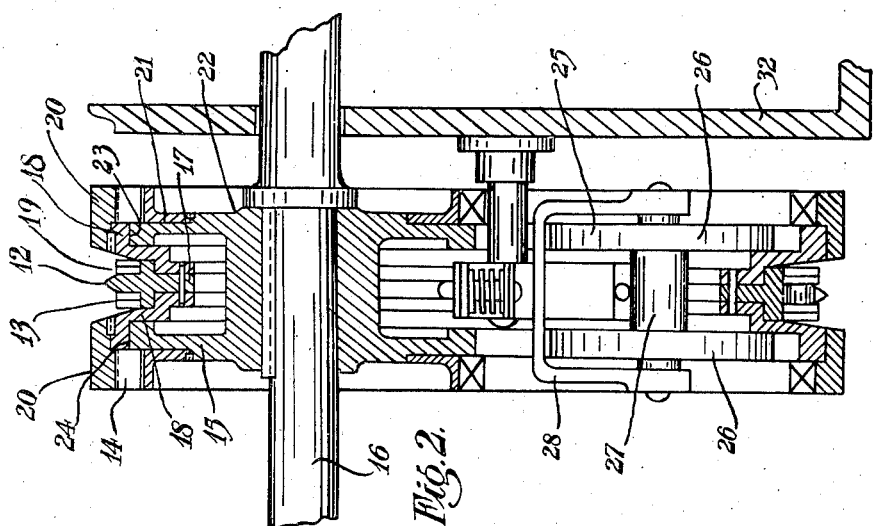
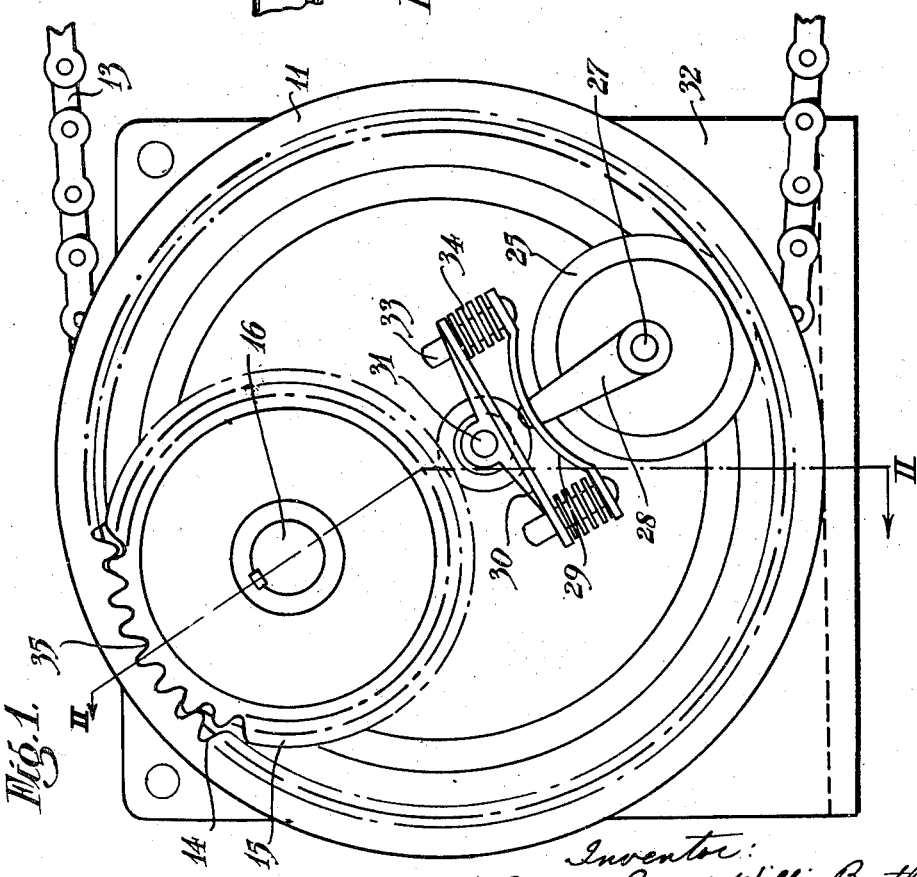
Inventor:
Benson George Willis Bartlett
by Fraser, Myers & Manley
his attorneys Feb. 22, 1949.   B. G. W. BARTLETT   2,462,455
ANNULAR FLOATING TOOTHED GEARING
Filed Aug. 9, 1945   2 Sheets-Sheet 2

Inventor:
Benson George Wellis Bartlett
by Fraser, Myers & Manley
his attorneys.

Patented Feb. 22, 1949

2,462,455

UNITED STATES PATENT OFFICE 2,462,455

ANNULAR FLOATING TOOTHED GEARING

Benson George Willis Bartlett, Darlington, England, assignor of one-half to Northern Patent Developments, Limited, Darlington, England, a company of Great Britain and Northern Ireland Application August 9, 1945, Serial No. 609,757
In Great Britain August 12, 1943

Section 1, Public Law 690, August 8, 1946
Patent expires August 12, 1963

7 Claims. (Cl. 74—413)

This invention relates to floating annular toothed gearing of the type wherein a toothed gear is disposed on the inner surface of an annular floating ring and is adapted to engage an externally toothed pinion, and wherein an external annular portion of said floating ring, which may be of the character of a gear comprising spur sprocket teeth or a pulley surface, is adapted to be engaged by a drive transmission member, as, for example, a toothed gear wheel, a belt or a chain for the purpose of transmitting a drive to or from the said inner toothed pinion. The object of the invention is to provide improvements in annular gearing of the type described.

Floating annular gearing of the type described, according to this invention, is characterised in that the diameter of the pulley surface or the pitch diameter of the external gear on the annular ring is equal to the pitch diameter of the internal gear thereon.

Referring to the accompanying drawings:

Fig. 1 is an elevation of one form of annular gearing according to the invention, and Fig. 2 is a corresponding transverse sectional elevation on line II—II of Fig. 1.

Figure 3:
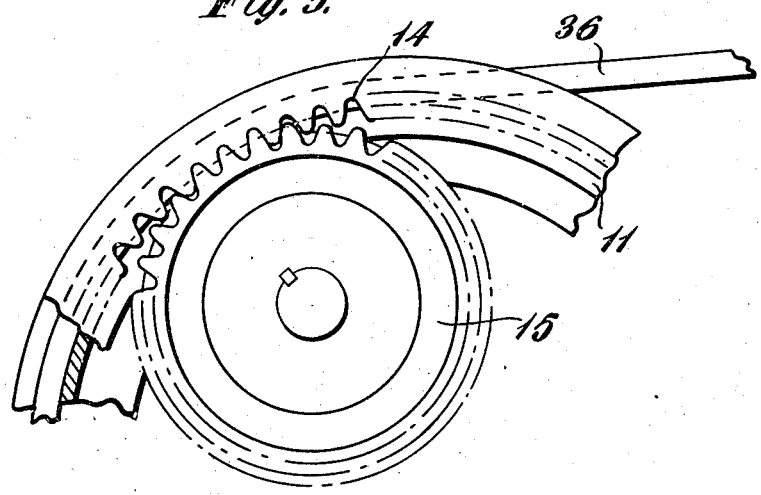
Fig. 3 is a fragmentary elevation of a modified form.

In Figs. 1 and 2 an annular floating ring 11 is provided with an external annular portion, as, for example, a sprocket gear 12 adapted to be engaged by a drive transmission member, as, for example, a chain 13 whereby a drive may be transmitted from a driving member not shown. The ring 11 is also provided with an internal toothed gear 14 adapted to engage the teeth of a toothed pinion 15 mounted on a shaft 16 to which the said drive is to be transmitted. The sprocket tooth gear 12 is formed on a ring 17 disposed between two other rings 18, 18, the said rings 18, 18 forming an annular channel 19 in which the gear 12 is disposed. The internal gear 14 is formed in two axially aligned portions on two rings 20, 20, each disposed on and secured to one of the rings 18. The pitch diameters of the two portions of the gear 14 and of the sprocket gear 12 are equal, and, as both the said gears have the same axis, the pitch circles will be transversely aligned. The toothed pinion 15 comprises two toothed rings 21, 21, disposed one on each side of and secured to a disc 22, the perimeter of said disc forming shrouds 23 to the teeth on the rings 21 at the pitch circles thereof. The rings 18 also provide shrouds 24 for the internal teeth on the rings 20 at the pitch circles thereof, and the shrouds 23 are adapted to roll on the shrouds 24 when the gear 15 engages the gear 14.

A roller 25, which acts as a safety keep formed of two discs 26, 26 mounted on a spring loaded spindle 27, is also adapted to roll on the shrouds 24, or some other flange of the floating ring. The said spindle 27 is mounted in a fork 28 on a plate 29. Another plate 30 is rigidly or pivotally mounted on a spindle 31 projecting from a plate 32 and the plate 29 is resiliently supported by the plate 30 by means of pins 33 and springs 34. The relative positions of the shrouded annular ring 11, the pinion 15 and the roller 25 are such that the axes thereof are in alignment, the axis of roller 25 being diametrically opposite the axis of pinion 15 relative to the axis of ring 11, when the runs of the chain or belt 13 are adjusted and more or less taut, and a line through the axis of pinion 15 and the point of contact 35 between the interal gear 14 and the pinion 15 makes an angle of approximately 130 degrees with a line through the axes of the pinion 15 and the driving member (not shown). The springs 34 press the roller 25 on to the shrouds 24 of the annular ring 11, and the roller 25 which functions under spring tension facilitates the adjustment of the chain or belt and acts as a safety device to retain the ring 11 in position in the event of chain or belt breakages.

Figure 4:
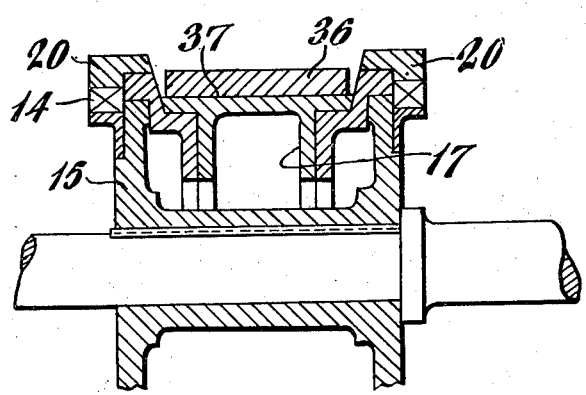
Fig. 4 is a corresponding transverse sectional elevation.

In the modified form of device shown in Figs. 3 and 4 the drive is transmitted from the driving member (not shown) by means of a drive transmission member in the form of a belt 36, the annular shrouded ring 11 being provided externally with a co-acting pulley surface 37 on a ring 17; the pulley surface 37 is transversely aligned with the pitch circles of the toothed rings 20 of the internal gear 14. The remaining features of the annular gear are similar to those in the form shown in Figs. 1 and 2.

By using an improved floating annular gear according to this invention when gearing up within limits and transmitting a high velocity drive over small diameter sprockets power losses are considerably reduced when transmitting a high velocity drive from the driving to the driven member as shown in this particular instance.

It will be recognised that the means specified will be particularly efficient when the mechanism is functioning under excessive loads.

What I claim and desire to secure by Letters Patent is:

1. Gearing comprising a pinion, a drive-transmission member, and a floating ring for transmitting driving movement between said pinion and member, the said floating ring having an internal toothed gear in driving-coacting relationship with said pinion and an external annular portion in driving-coacting relationship with said drive-transmission member, and the pitch diameter of said internal toothed gear being substantially equal to the diameter of said external annular portion at which the driving relationship is effective between the latter and said drive-transmission member.

2. Gearing according to claim 1, further characterized in that the said internal toothed gear and said external annular portion of the floating ring are in axial alignment.

3. Gearing according to claim 1, further characterized in that the said external annular portion of the floating ring is a toothed gear and said drive-transmission member has portions which, in operation, mesh with said latter toothed gear.

4. Gearing according to claim 1, further characterized in that the said external annular portion of the floating ring is a sprocket gear and said drive-transmission member is a chain drivingly coacting with said sprocket gear.

5. Gearing according to claim 1, further characterized in that the said external annular portion of the floating ring is a pulley surface and said drive-transmission member is a belt drivingly coacting with said pulley surface.

6. Gearing according to claim 1, further characterized in that the said floating ring has substantially similar opposite annular side portions and an external circumferential recess intermediate said side portions, the said internal toothed gear being in two similar portions disposed upon the inner peripheries of said side portions, the said external annular portion being located in said circumferential recess, and the pinion having its teeth in two similar annular parts in meshing relationship with the two mentioned similar portions of the internal toothed gear.

7. Gearing according to claim 6, further characterized in that the said pinion comprises spaced outwardly extending radial flanges on which the said two parts of the pinion teeth are disposed and said floating ring has a radial flange extending inwardly between and in guiding relationship with respect to said flanges of the pinion to maintain the latter and said ring in intimate axial operating association.

BENSON GEORGE WILLIS BARTLETT.

REFERENCES CITED

The following references are of record in the file of this patent:

UNITED STATES PATENTS

| Number | Name | Date |
|---|---|---|
| 426,370 | Evans | Apr. 22, 1890 |
| 451,987 | Underwood | May 12, 1891 |
| 453,630 | Evans | June 9, 1891 |

FOREIGN PATENTS

| Number | Country | Date |
|---|---|---|
| 415,085 | Great Britain | Aug. 17, 1934 |
| 457,016 | France | July 2, 1913 |